United States Patent [19]

Rejto

[11] 4,223,057

[45] Sep. 16, 1980

[54] SIMULTANEOUS TRANSFER PRINTING AND EMBOSSING OR SURFACE TEXTURING METHOD, AND EMBOSSING MEMBER FOR USE THEREIN

[76] Inventor: Thomas Rejto, 19 Homestead Rd., Greenwich, Conn. 06830

[21] Appl. No.: 797,542

[22] Filed: May 16, 1977

Related U.S. Application Data

[60] Division of Ser. No. 759,887, Jan. 17, 1977, Pat. No. 4,049,374, which is a continuation-in-part of Ser. No. 597,562, Jul. 21, 1975, abandoned.

[51] Int. Cl.[2] .......................... B32B 3/10; B32B 3/30

[52] U.S. Cl. ...................................... 428/138; 28/169; 428/159; 428/172; 428/195; 428/286; 428/288; 428/290; 428/296; 428/305; 428/317; 428/913; 428/914

[58] Field of Search ............... 428/914, 913, 171, 172, 428/156, 290, 317, 159, 131, 138, 195, 286, 288, 296, 305; 427/248 H, 148; 28/169; 101/28, 29, 32, 470; 8/2.5 A; 264/783; 156/219, 220, 247

[56] References Cited

U.S. PATENT DOCUMENTS

| | | | |
|---|---|---|---|
| 1,895,243 | 1/1933 | Dort | 101/470 |
| 2,370,186 | 2/1945 | Oldofredi | 101/28 |
| 2,549,847 | 4/1951 | Oldofredi | 101/28 |
| 2,681,612 | 6/1954 | Reimann | 101/32 |
| 2,783,175 | 2/1957 | Smith et al. | 101/32 |
| 3,485,706 | 12/1969 | Evans | 428/171 |
| 3,649,332 | 3/1972 | Dybrig | 428/914 |
| 3,669,713 | 6/1977 | Newman et al. | 428/914 |
| 3,676,239 | 7/1972 | Soehrgen | 428/290 |
| 3,860,388 | 11/1975 | Haigh | 8/251 |
| 3,868,214 | 2/1975 | Shackleton | 28/169 |
| 3,915,628 | 10/1975 | Bossard et al. | 101/470 |
| 4,059,471 | 11/1977 | Haigh | 428/195 |
| 4,111,646 | 9/1978 | Buchinaltes et al. | 78/159 |

FOREIGN PATENT DOCUMENTS

| | | |
|---|---|---|
| 592548 | 9/1947 | United Kingdom . |
| 1432197 | 4/1976 | United Kingdom . |

OTHER PUBLICATIONS

E. J. Gorondy, Textile Chemist and Colorist, Jun. 1978, pp. 105/19 to 107/21.

*Primary Examiner*—Stanley S. Silverman

[57] ABSTRACT

A fabric containing thermoplastic fibers is simultaneously printed with a first pattern in a sublimable or vaporizable dye and embossed or surface textured with a second pattern, without substantial effect on the printing of the first pattern, by the application of heat and pressure to a stack comprising a heat transfer printing sheet bearing a vaporizable or sublimable dye in the first pattern, an embossing sheet of material permeable to said dye and having no affinity or retention properties therefor and having a second pattern formed in relief in at least one surface thereof, and a sheet of fabric to be printed and embossed. The printing and embossing sheets may be combined into a unitary sheet, and the embossing sheet may include a dye trap such as an emulsion or solution of an acrylic resin disposed in a third pattern.

5 Claims, 4 Drawing Figures

SIMULTANEOUS TRANSFER PRINTING AND EMBOSSING OR SURFACE TEXTURING METHOD, AND EMBOSSING MEMBER FOR USE THEREIN

This is a division of application Ser. No. 759,887 filed Jan. 17, 1977, now U.S. Pat. No. 4,049,374, and which is a continuation-in-part of my copending application Ser. No. 597,562 filed July 21, 1975 now abandoned.

The present invention relates to the simultaneous heat transfer printing and embossing or surface texturing of fabrics or other sheet materials containing thermoplastic fibers. The invention provides a process for such simultaneous printing and embossing in which the heat transfer pattern printed in sublimable dye is substantially unaffected by the embossing, and the invention provides an embossing sheet for use in that process.

It is already known to produce decorated fabrics by exposing them to a sheet of transfer material, such as a smooth sheet of paper, carrying a vaporizable or sublimable dyestuff. By the application of heat to the transfer sheet when pressed against the fabric, the dyestuff is caused to migrate to the fabric in vapor form, and there is produced on the fabric a reverse replica of the pattern in which the dyestuff was laid down on the transfer sheet. The heat and pressure employed in the process however render the surface of the fabric smooth and slippery, making the fabric undesirable for many uses, for example in certain kinds of clothing and upholstery. One cause of this effect is that the heat transfer operation is carried out at a temperature approaching or reaching the softening point of the thermoplastic fibers. I have discovered, as is disclosed in my copending application Ser. No. 597,562 above identified, that this undesirable slipperiness of the printed fabric may be avoided by using an embossing sheet to impart a surface texture to the fabric, at the same time as the sublimable dye is transferred thereto in order to print it. In particular I have disclosed in that copending application a process in which the embossing sheet is interposed between the transfer sheet and the fabric during the application of heat and pressure, and in which the embossing sheet is made of a porous material such as fiberglass which can let through the major portion of the sublimating dyestuff. With that process there is obtained on the fabric an embossing or surface texturing effect practically without any change in the design on the transfer sheet as printed on the fabric by the sublimable dyestuff. This is in contradistinction to a process in which the material of the embossing sheet is substantially or largely impermeable to the dyestuff, or has an affinity for such dyestuff, so that the dyestuff reaches the fabric only through perforations provided in the embossing sheet to define the embossing pattern therein, and hence colors only the portions of the fabric opposite those perforations. In such a process, the dyestuff actually appears, therefore, on the fabric in a pattern which is a subtractive combination of the pattern in which the dyestuff is present on the transfer sheet with the three-dimensional pattern on the embossing sheet. Usually moreover the embossing sheet, which may be a lace, crochet work or other openwork fabric, is itself "printed" or soiled with the dye during the transfer operation and can be used only once, unless a cleaning operation is performed on it. Such a process is therefore usually restricted in its application to the preparation of coordinated fashion items wherein the lace or crochet work used as a stencil or embossing sheet and the printed and embossed fabric can both be utilized as end product fabrics.

According to the present invention, a process of producing a heat transfer printed and simultaneously surface textured or embossed fabric includes the steps of pressing together in superposed relation the fabric to be printed and textured, an embossing or surface texturing sheet the material of which is permeable to the vapor of a sublimable dye but which has no affinity or retention properties for such dyes, and a heat transfer sheet bearing a vaporizable or sublimable dye with a high affinity for thermoplastic fibers and a strong volatility and penetration strength, applying to the sheets as so superposed sufficient heat and pressure to print the fabric with the dye, in the pattern in which it appears on the transfer sheet, and permanently to emboss the fabric with the three-dimensional pattern on the embossing sheet, and separating the fabric from the stack after completion of the printing and embossing.

The dyestuff may be a dispersible or cationic dyestuff, vaporizable or sublimable at a temperature which is lower than the melting point of the material to be printed. It should have a high affinity for all or some thermoplastic man-made fibers such as polyesters, polyamides, acrylics, modacrylics and others. It should have no affinity for the constituents of the embossing sheet. It should have a strong migrating and penetrating power in order to be able to pass through the embossing sheet and to penetrate sufficiently into the material to be printed. While low energy dispersible dyestuffs seem theoretically the most suitable, some medium and high energy dispersible dyestuffs and some cationic and other dyestuffs may also give satisfactory results.

The surface texturing or embossing sheet should be made of materials having no affinity or retention properties for dyestuffs of the above described categories. Such materials include fiber glass, rayon, cotton, or silk for example, and also binders having similar properties. These materials are permeable to vaporized or sublimated dyestuffs of the above-described types. The embossing sheet may be a non-woven sheet or of woven, knitted, crocheted, braided or other construction. It may be foraminous and will have at least one face with a non-flat, textured surface exhibiting a three-dimensional pattern. The three-dimensional pattern of that surface will determine the pattern of the three-dimensional effect obtained in the sheet material being printed and embossed.

BRIEF DESCRIPTION OF THE DRAWING

The invention will now be further described in terms of two presently preferred modes of practice of the process thereof and in terms of two presently preferred embodiments of the embossing sheet thereof and with reference to the the accompanying drawing in which.

DESCRIPTION OF THE PREFERRED MODES OF PRACTICE OF THE INVENTION AND OF THE PREFERRED EMBODIMENTS OF THE EMBOSSING SHEET THEREOF

Figure 1:
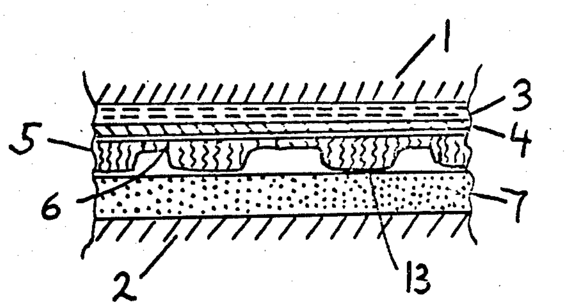
FIG. 1 is a fragmentary cross section, at an enlarged scale, of a fabric in superposed relation to the other elements, including the novel embossing sheet of the invention, by means of which the process of the invention is performed on that fabric.

Referring to FIG. 1, a heat transfer printing sheet 3, for example of paper, bearing on one face a coating 4 of a vaporizable or sublimable dyestuff, an embossing or texturing sheet 5, and a sheet 7 to be printed and embossed, are disposed in superposed stacked relation between the relatively movable members 1 and 2 of a press and with the sheet 5 between the sheets 3 and 7.

The sheet 7 may for example be a white polyester fabric. The coating 4 is on the face of the sheet 3 turned toward the sheets 5 and 7 and defines a first pattern to be printed on the sheet 7 by migration of the dye as a vapor from the coating 4 through the sheet 5 and into the fabric 7. The coating 4 may however be uniform over the sheet 3.

The sheet 5 bears on the face thereof turned toward the sheet 7 a second pattern, which is howver a three-dimensional pattern, i.e. a pattern in relief, and not a pattern in color or of light and dark. This second pattern is indicated in the drawing by the indentations or hollows 6.

One or both of the press members or platens 1 and 2 includes means, not shown in the drawing, for the delivery of heat to the stack of sheets 3, 5 and 7. Thus at least one press member may include conduits forthe circulation of a heated fluid therethrough, or may bear electric resistances.

The novel embossing sheet 5 of the invention may be either of non-woven of of woven, knitted, crocheted, braided or other construction, of a material such as fiber glass, rayon, cotton or silk, optionally with a suitable binder or binders (especially if the material is non-woven). Suitable binders for example are polyvinyl alcohol, polyvinyl pyrrolidone, and carboxy methyl cellulose. For example the sheet 5 may be of bundled or spun-laced rayon non-woven fabric. It is permeable to vaporized or sublimated dyestuffs and is without affinity therefor. In particular the sheet 5 is permeable to such dyestuffs over the whole surface thereof, substantially independently of the three-dimensional pattern thereon, i.e. the second pattern above referred to. The embossing sheet is permeable to the dye vapor not only due to the material of which it is made but also to the construction thereof, which is sufficiently loose and porous to permit ready passage of the dye vapor between the filaments of the sheet. Thus the sheet 5 is permeable to the dyestuff at the full-thickness portions 13 thereof as well as at the reduced thickness portions thereof indicated by the hollows 6. The sheet 5 must of course be able to withstand, without melting and preferably without softening, the temperatures employed in the process of the invention, which as below indicated may for example be of the order of 400° F.

The pattern on the embossing sheet may comprise for example a rectangular array of, say, 250 square depressions or hollows per square inch, resembling in miniature the appearance of a waffle.

The sheet 3 may be of paper. An example of a suitable material for the coating 4 is an ink containing 6% of Disperse Red 4 (color index number 60755 in the 1976 Buyers Guide to U.S. Producers and Suppliers of Dyes, Pigments and Chemical Specialties for the Wet Processing Industries, published by the American Association of Textile Chemists and Colorists).

The layers 3, 5 and 7 of the stack are then pressed together and heated by the press, for example to a temperature of about 400° F. for a period of 30 seconds. The pressure may vary widely according to circumstances, and may for example be in the range from 1 to 50 lbs./sq. in.

Upon opening the press and separating the layers of the stack, the major part of the dyestuff will have migrated to the fabric 7 through the embossing sheet 5, without notably soiling or coloring the latter. The fabric 7 is permanently dyed red (in the case of the dye above suggested as an example), and in a reverse replica of the pattern in which the coating 4 appeared on the transfer sheet 3. It is also permanently textured, on the dyed face thereof which was adjacent to the sheet 5 during the pressing and heating step. Thus, if the pattern on the embossing sheet is the rectangular array of depressions above described, the embossed sheet will have a "hand" comparable to that of a woven fabric with a basket weave pattern. Moreover the replica on the sheet 7 of the pattern of the dye 4 is substantially unaffected by the pattern in relief now also present on the fabric sheet 7.

Figure 2:
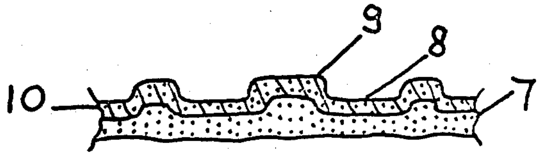
FIG. 2 is a similar cross section of the fabric after performance of the process.

The resultant dyed and textured fabric 7 is illustrated digrammatically in enlarged cross section in FIG. 2, where reference character 9 identifies the raised portions corresponding to the hollows 6 in sheet 5, reference character 8 identifying the resulting hollows in the surface of the fabric, and reference character 10 identifying the layer or portion of the thickness of the fabric permeated by the dye.

Other suitable dyestuffs for use in the process of the invention are Disperse Blue 134 and Disperse Yellow 54, also identified in the above-cited publication. Blends of the cited dyes may also be employed.

According to another feature of the invention, the pattern of color (or of light and dark) produced by the sublimable dye on the transfer sheet may be modified, as transferred to the fabric to be dyed and textured, by inclusion in the embossing sheet of a dye trap, either in a continuous coating or according to a third pattern. An emulsion or solution containing an acrylic resin may be used for this purpose.

Figure 3:
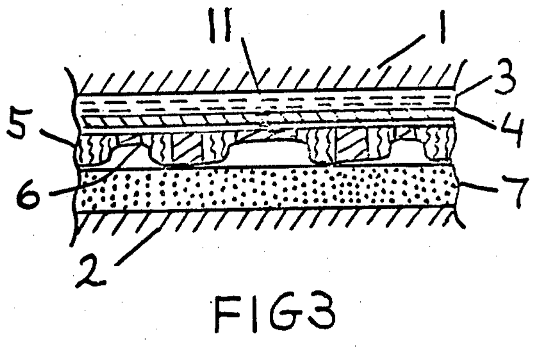
FIGS. 3 and 4 are fragmentary views respectively similar to FIGS. 1 and 2 but illustrating a variant form of the process of the invention and of the embossing sheet of the invention.
Figure 4:
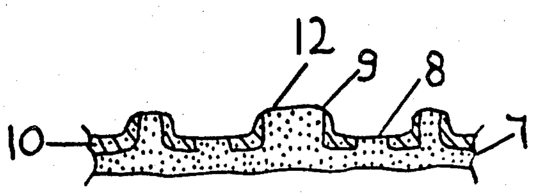

FIGS. 3 and 4 illustrate diagrammatically this process according to the invention, the novel embossing sheet employed therein, and the resulting dyed fabric. The elements of structure of FIG. 3 are the same as those bearing corresponding reference characters in FIG. 1, except that in FIG. 3 the embossing sheet 5 includes areas 11, further identified by batching lines extending diagonally from upper right to lower left, impregnated with a dye trap as above described. During the simultaneous application of heat and pressure to the stack, as described in connection with FIGS. 1 and 2, these portions 11 of the sheet 5 absorb and hold the dye, so that the adjacent portions of the fabric sheet 7 are undyed in the final product, as indicated at 12 in FIG. 4.

Thus to recapitulate, the invention provides a method of printing onto a sheet containing thermoplastic fibers a replica of a pattern in one or more colors (which may be also black and white or shades of gray) and of simultaneously embossing into that sheet a replica of a second three-dimensional pattern, the first pattern as printed onto the sheet containing thermoplastic fibers being substantially unaffected by the embossing of the second into that sheet. The method comprises the steps of superposing a heat transfer printing sheet bearing on one face a sublimable or vaporizable dye according to the first pattern, said dye having a high affinity for the thermoplastic fibers and strong volatility and penetration strength, an embossing sheet permeable to said dye and made of material having no affinity or retention properties for said dye, said embossing sheet having in the face thereof remote from said printing sheet a design in relief according to a second pattern, the embossing sheet further optionally having a dye trap disposed therein in a third pattern, and a sheet containing thermoplastic fibers, applying heat and pressure to the superposed sheets to cause migration of the dye through the material of the embossing heat into the sheet containing thermoplastic fibers and to cause the reproduction of the second pattern in relief in the sheet containing thermoplastic fibers, and separating the sheets of the stack. For the practice of this process the invention provides an embossing sheet comprising a material permeable to a vaporizable or sublimable dye and having a three-dimensional pattern formed in at least one face thereof, the embossing sheet optionally having a dye trap disposed therein according to another pattern.

While the invention has been described hereinabove in terms of two presently preferred modes of practice of the method thereof and in terms of two presently preferred embodiments of the embossing sheet thereof, the invention is not limited thereto. Thus, other means than the static transfer press described may be employed for the application of heat and pressure to the stack. Calendering rolls may be employed, or there may be employed a heated calender roll and a continuous belt or "apron" held with pressure against a portion of the periphery of the calender roll by suitably disposed and mounted idler rolls, as described in my copending application Ser. No. 597,562 and in the division thereof, Ser. No. 706,300 filed July 19, 1976.

It is also possible to combine the dye-bearing transfer or printing sheet and the embossing sheet into one. Thus a separately formed embossing sheet may be bonded with a dye-permeable glue to the transfer sheet, or the embossing surface may be formed on the transfer sheet, for example with the help of coating rolls or printing rolls.

The embossing sheet may be either as hereinabove described, with an embossing or texturing surface in one face thereof but smooth and continuous on the other face, or it may have its embossing pattern defined by perforations through the sheet. At the locations opposite these perforations (corresponding in location to the hollows 6 of FIGS. 1 and 3), the embossed and printed fabric sheet produced by performance of the process of the invention will exhibit portions in relief like the protrusions 9 of FIG. 2. The remaining portions of the embossing sheet in this variant construction thereof, which may be thought of as cross bars if the perforations make up a rectangular grid, will again however be permeable to the dye on the printing or transfer sheet, as are the full thickness portions of the embossing sheet 5, between the hollows 6, in the embodiments illustrated in FIGS. 1 and 3. The dye trap, when employed, can also be constituted by the introduction into the embossing sheet of fibers which retain the dyes used in transfer printing.

More generally, the invention comprehends all modifications of and departures from the modes of practice and the embodiments hereinabove described which fall within the spirit and scope of the appended claims.

I claim:

1. A sheet, having ends, used as embossing member in the simultaneous embossing and heat transfer printing of fabrics containing thermoplastic fibers, said sheet comprising a heat resistant material with practically no affinity or permanent retention properties for vaporizable or sublimable dyes used in the process, but being permeable to vapors and/or gases of these dyes, the free circulation of the vapors and gases through the sheet being considerably improved by a sufficiently loose and/or porous construction, which construction makes it however insufficiently inert and/or insufficiently resistant to mechanical stress to be formed into an endless belt for service on a continuous heat transfer printing apparatus, said sheet having in at least one face a pattern in relief the three dimensional effect being created by alternation of raised and hollow portions and/or by apertures said pattern being permanently embossed in relief into the fabric to be decorated during the heat transfer printing operation, distinctively from the pattern in color transferred simultaneously without substantial alteration into the fabric from said sheet which being united with a temporary dye-bearing organ or being a unitary printing-embossing sheet, stores, already before its use on a heat transfer printing apparatus, in a dried state, highly volatile and penetrant sublimable and/or vaporizable dye in sufficient quantity to color at least one fabric during the simultaneous embossing and heat transfer printing process executed at a 340°–430° F. temperature range, corresponding to the softening point of the fabric to be decorated as well as to the vaporization or sublimation temperature of the dye.

2. A sheet according to claim 1, wherein a binder, non obstructive to the circulation of dye vapors and/or gases is added to said sheet in order to improve its strength which, due to its loose and/or porous construction is insufficient to support without risk of damage a continuous heat transfer operation.

3. A sheet according to claim 2, wherein in supplement or in replacement of the binder permeable to dye vapors and/or gases an element obstructive to the passage of said vapors and/or gases is added to said sheet, said element being arranged in form of a supplementary pattern which creates on the fabric a substractive combination with the pattern in color.

4. A sheet according to claim 3, wherein the element obstructive to the passage of dye vapors and/or gases is of man-made thermoplastic resins and/or fibers with affinity and retention properties for sublimable or vaporizable dyes used in heat transfer printing.

5. A sheet according to claim 2, wherein said sheet is a bundled or spun laced rayon non-woven fabric and the binder is polyvinyl alcohol, polyvinyl pyrrolidone, or carboxymethyl cellulose.

* * * * *